No. 776,380. PATENTED NOV. 29, 1904.
F. BRAUN.
METHOD OF PRODUCING QUICK ELECTRICAL OSCILLATIONS OF DIFFERENT PHASES.
APPLICATION FILED JULY 26, 1904.
NO MODEL.
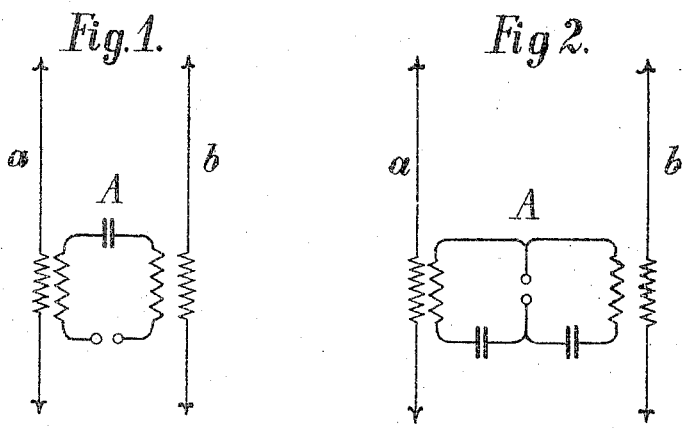
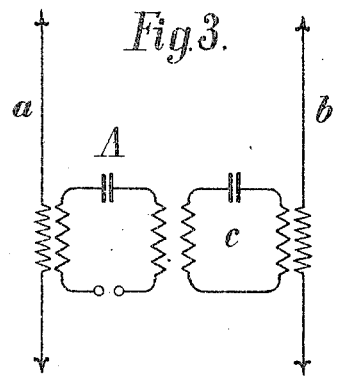
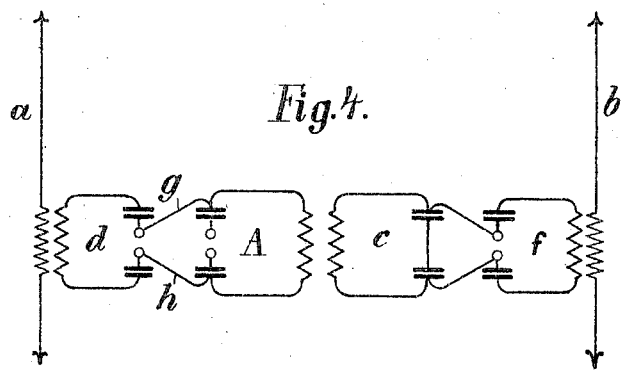
Witnesses:
S. J. Hoexter
O. F. Smith
Inventor:
Ferdinand Braun
By Knight Bros
Attys No. 776,380. Patented November 29, 1904.

UNITED STATES PATENT OFFICE.

FERDINAND BRAUN, OF STRASSBURG, GERMANY.

METHOD OF PRODUCING QUICK ELECTRICAL OSCILLATIONS OF DIFFERENT PHASES.

SPECIFICATION forming part of Letters Patent No. 776,380, dated November 29, 1904.

Application filed July 26, 1904. Serial No. 218,283. (No model.)

*To all whom it may concern:*

Be it known that I, FERDINAND BRAUN, professor, a subject of the German Emperor, residing at Strassburg, Alsace, Germany, have invented a certain new and useful Improvement in Methods of Producing Quick Electrical Oscillations of Different Phases, of which the following is a full, clear, and exact description, reference being had to the accompanying drawings, forming a part of this specification.

The present invention relates to a method for producing quick currents with phase difference in an economical manner.

The method consists, essentially, in coupling those oscillating elements in which quick currents with phase difference are to be produced with an exciting oscillating circuit either inductively or directly with different strength, according to the degree of the required phase difference of the oscillations.

The method can be advantageously used for spark telegraphy. Especially in connection with transmitting-stations with several transmitting-wires oscillating in different phase for radiating the waves in a definitive direction the new method offers an effective means for obtaining the phase difference required between the single aerial conductors in a safe manner and without a great loss of energy.

The method permits also of exciting one or more transmitters successively in such a manner as to obtain a continuous radiation of the rays.

The new method is based on the following principle: An oscillating circuit A, Figure 3, consisting of capacity and self-induction, acts inductively with a second oscillating circuit $c$, which is metallically closed, both circuits being in resonance with each other. Current and voltage (measured at the terminals of the condenser) are marked $i_1$ $V_1$ and $i_2$ $V_2$, respectively. In this case $i_1$ and $i_2$ are generally displaced against $V_1$ and $V_2$ by ninety degrees. The variation of time $\frac{di_1}{dt}$ is displaced against $i_1$ by ninety degrees or in phase with $V_1$, (or displaced by one hundred and eighty degrees.) In the case of resonance, however, $i_2$ is in phase with $di_1/dt$. Hence it follows that $i_2$ and $V_2$ are displaced against $i_1$ and $V_1$, respectively, by ninety degrees. This is the theory in case of very loose coupling. The question is what the difference of phase will be in case of a still useful coupling of both circuits. In order to form a judgment, both criterions—viz., the mutual condition of current and voltage—can be considered and will give useful results. In a test, for instance, for coupling by mutual induction only twelve per cent. of the self-induction contained in each of the two exactly identical circuits were utilized and loosely coupled at a corresponding distance. In spite of this fact more than thirty per cent. of the energy of the primary circuit was transmitted to the secondary circuit with a phase displacement of seventy-two degrees up to seventy-eight degrees. By increasing the coupling the distribution of energy may be increased at the expense of the purity of the phenomena. In this case the following points are to be observed: There can be no question of a resonance in the sense of most of the acoustical phenomena. By resonance of two bodies with the proper oscillation $V_1$ and $V_2$ we understand a case where $V_1$ is equal to $V_2$ and $V_1$, while $V$ is the resonance oscillation which coincides with the proper oscillation. From an electrical standpoint, however, if two such swinging bodies are coupled two oscillations $n_1$ and $n_2$ will generally be produced where $n_1 > V$ and $n_2 < V$. This applies also if $V_1 \leqq V_2$. One could therefore say that $n_1$ and $n_2$ in the two parts of the coupled system are necessarily in resonance with each other. The claim that the proper oscillation $V_1$ and $V_2$ of the two systems are the same (V) is therefore no longer a fundamental one, but becomes a practical one, which may vary in certain limits. Assuming $V_1 = V_2$ to be in resonance with each other, the transmission of energy to the excited system simultaneously with the amount of phase difference for the resonance (or at least its proximity) is a maximum. Only in this sense can and shall electric resonance be discussed here. In the case of very loose coupling the more simple acoustical case is approached.

The phase difference obtained with the above-described method can be proved and measured from the heat or the effect of the sparks in a resonance jar-circuit. For frequencies of about six thousand up to ten thousand period per second the phase difference can be followed in the same manner as the complete course of the phenomena by employing the cathode-ray tube.

The advantage of the method consists in the low-energy losses. Methods for phase displacement in which, for instance, ohmic resistances are used will fail in practice with increasing frequency, as the current strengths depend almost exclusively on the inductive resistances. The resistances would have to become very large, and the energy losses caused thereby would be excessive in a case where energy is to be saved.

The accompanying drawings show a few examples for the application of the method in spark telegraphy.

Figs. 1, 2, and 3 represent transmitter connections each coöperating with two aerial conductors which are to be produced for the purpose of determining the direction of the waves in different phases. According to the new method this can be attained by coupling both aerial conductors $a$ $b$ with a common oscillating circuit A, Figs. 1 and 2, in which case the coupling strength of the two aerial conductors must vary according to the degree of the desired phase difference.

In the connection shown in Fig. 2 the transformers are arranged parallel with the sparking distance of the exciting-circuit. The aerial conductors can also be connected directly—i. e., conductively—with the oscillating circuits, when a coupling variety can be obtained by giving different self-induction to that part of the circuit which is common to both oscillating circuits and aerial conductors.

In Fig. 3 the aerial conductor $b$ does not act simultaneously with the exciting-circuit A, but by the interference of an oscillating circuit which is metallically closed and whose inductive coupling, in connection with the exciting-circuit A, deviates from the coupling strength of the aerial conductor $a$. As regards the coupling strength of the aerial conductor $a$ with the exciting-circuit A and that of the aerial conductor $b$ with the oscillating circuit $c$ no difference need be made in this case.

Fig. 4 represents a transmitter which, in connection with the new method, is intended for producing quick oscillations of long duration in such a manner that when, for instance, the aerial conductor $a$ has died away the aerial conductor $b$ begins to swing in equal phase. In this case a system of high frequency is excited by oscillations of generally low frequency. The exciting-circuit A, with its large amount of energy, excites the oscillating circuit $d$, with which it is conductively connected, whereas the oscillating circuit $c$, which is inductively coupled with the exciting-circuit A, excites the oscillating circuit $f$, which latter is likewise conductively connected with the circuit $c$.

By suitably selecting the self-induction of A on the one hand and that of the connecting-lines $g$ $h$ on the other hand the energy of the oscillations produced in the excited circuit A can be made to materially exceed the amount of energy obtained in the case of a static charge of the circuit on the same spark length. The circuits $d$ and $f$ may also be metallically closed—i. e., without the sparking distances. In this case it is advisable to connect the lines $g$ and $h$ with the circuit $d$ or $f$ outside the condensers, so that they are separated from each other by a higher self-induction. The coupling strength depends on the position of the connecting-points of the lines $g$ and $h$ for the circuits A $d$ and $c$ $f$, respectively. A numerical example will show how the above-described effect is to be obtained. We assume a drop of limit of a single oscillation in every coupled system, (loose coupling,) supposing the oscillations required in the circuits $d$ and $f$ be of the frequency $10^6$, and $f$ shall begin to swing after ten oscillations in the circuit $d$ have died away. For this purpose I construct an oscillating circuit A of the proper frequency $10^4$, from which I excite the circuit $c$ by inductive transmission with a phase difference of thirty-six degrees. This corresponds to a time difference of $1/10.10^{-4}$ seconds—i. e., to a direction of ten of the quicker oscillations, ($-10^{-5}$ seconds.) It is clear that the method can also be applied to the more slowly oscillating circuits A, for instance, by using two circuits instead of a single circuit A, which two circuits are again excited by still slower oscillations in phase difference either mechanically or electrically in the usual manner. The method may also be used for several circuits—for instance, two circuits with a phase difference of about thirty-six and seventy-two degrees. It is obvious that instead of two aerial conductors a single conductor may be employed on which the oscillating circuits $d$ and $f$ act jointly.

By means of currents with phase difference quickly-rotating magnet-fields or rotating electrostatic fields can be produced analogous to the arrangements in alternating-current systems from which magnet-fields currents of any phase difference may be taken.

Having explained my invention, what I claim, and desire to secure by Letters Patent, is—

1. In a system for producing quick currents in phase difference, oscillating elements, in which the electric energy is required to oscillate in phase difference, excited by a common oscillating circuit, with which they are coupled either inductively or conductively with different strength.

2. In a system for producing quick currents with phase difference in aerial conductors of transmitters for spark telegraphy, aerial conductors coupled with a common exciting-circuit, either inductively or conductively with different coupling strength, according to the required phase difference of the oscillations.

3. In a system for producing oscillations of long duration, as described above, two or more oscillating circuits with the same and relatively high frequency, excited successively by alternating currents of low frequency oscillating in phase difference.

4. In a system for producing oscillations of long duration, as described above, one or more oscillating circuits, excited successively by two or more oscillating circuits of low frequency which oscillate in phase difference.

5. In a system for producing oscillations of long duration in transmitters for spark telegraphy one or more aerial conductors, excited by oscillating circuits with the same and relatively high frequency, said circuits being excited successively by alternating currents of low frequency oscillating in phase difference.

6. In a system for producing oscillations of long duration, the condenser of one oscillating circuit, charged from two points of a second circuit, for the purpose of exciting one circuit by the other.

In witness whereof I hereunto subscribe my name this 9th day of July, A. D. 1904.

FERDINAND BRAUN.

Witnesses:
 H. BRANDER,
 GUSTAV SCHWEISS.